United States Patent [19]

Hasuike

[11] Patent Number: 4,856,855

[45] Date of Patent: Aug. 15, 1989

[54] MODULAR CABINET

[75] Inventor: Makio Hasuike, Milan, Italy

[73] Assignee: Seima Italiana SpA, Tolmezzo, Italy

[21] Appl. No.: 182,136

[22] Filed: Apr. 15, 1988

[30] Foreign Application Priority Data

Jul. 21, 1987 [IT] Italy .............................. 60412/87[U]

[51] Int. Cl.4 .............................................. F16B 12/00

[52] U.S. Cl. ................................ 312/111; 312/234.5; 312/244; 312/317.1; 312/330.1

[58] Field of Search .................. 312/234, 234.3, 234.5, 312/107, 111, 341 NR, 330, 320, 105, 317 R, 184, 348, 244

[56] References Cited

U.S. PATENT DOCUMENTS

| | | | |
|---|---|---|---|
| 394,377 | 12/1888 | Kiefer | 312/317 R |
| 2,667,392 | 1/1954 | Sexton | 312/244 |
| 3,203,744 | 8/1965 | Batke | 312/108 X |
| 3,751,127 | 8/1973 | Black et al. | 312/111 |
| 3,909,078 | 9/1975 | Riley | 312/341 NR |
| 4,245,715 | 5/1988 | Bussan et al. | 312/330 R |
| 4,501,456 | 2/1985 | Schafer | 312/348 X |
| 4,512,480 | 4/1983 | Evenson | 312/111 X |
| 4,544,213 | 10/1985 | Long et al. | 312/183 |
| 4,624,509 | 11/1986 | Ramsey | 312/234 |
| 4,634,193 | 1/1987 | Liu | 312/348 X |

*Primary Examiner*—Joseph Falk
*Attorney, Agent, or Firm*—Flynn, Thiel, Boutell & Tanis

[57] ABSTRACT

Modular cabinet (10) to hold and transport floppy-disks mini-disks, cards and other office materials in an organized manner, which comprises a cabinet case (39) and at least one extractable drawer (12) and can be combined with other cabinets and includes at least one drawer (12) with a front panel (20) and rear closure panel (21), the panels (20–21) being connected by a well (38) having edges (41), the front panel (20) comprising support feet (25), a lower central outer handle (15), an upper information display window (13) and a lock (14).

12 Claims, 7 Drawing Sheets

MODULAR CABINET

FIELD OF THE INVENTION

This invention concerns a multi-purpose modular cabinet suitable to hold office materials. To be more exact, the invention concerns a modular cabinet which can be combined with other cabinets by being placed alongside or above or below them and which contains one or more extractable drawers suitable to hold office materials.

BACKGROUND OF THE INVENTION

Modular cabinets of a combinable type with extractable drawers are known and consist normally of an outer case with or without an upper frontal hinged half-door and an extractable drawer.

Such cabinets comprise external male-female couplings spaced apart which enable the cabinets to be combined with other cabinets. They may hold one or more drawers.

These cabinets are not specially equipped and perform a plurality of usages in which the materials contained in them are normally loose.

Moreover, where the cabinets are combined with other cabinets, the reciprocal fixture system entails not a few problems during assembly and dismantling operations.

Furthermore, the known combinable, modular cabinets do not permit the coordinated containing of floppy-disks or mini-disks, nor do they enable the drawers to be handled independently in a simplified manner.

Besides, the known modular cabinets do not include independent locking systems.

Yet another drawback of the known systems is the difficulty involved in pulling out the drawers after a given number of uses of the drawers owing to the increase in friction between the components, which are made of plastic products.

These and other drawbacks are to be met with in the known modular cabinets.

The present applicant has designed, tested and embodied the present invention so as to obviate the above drawbacks and provide a plurality of advantages.

SUMMARY OF THE INVENTION

The invention provides for a modular, combinable cabinet. This modular cabinet may hold one or more extractable drawers which can be operated independently.

Each drawer is equipped advantageously with a lock and a display window, which lists the contents and can be read from several positions advantageously.

Moreover, the geometric straight lines of the conformation of the cabinet make possible easy handling and combination with other extraneous elements and create no security problems for a user.

According to the invention each drawer is provided advantageously with internal independent, lengthwise, carrying handles suitable to act as a lateral retainer means or as a vertical clamp for the contents or as a carrying handle.

According to the invention each drawer can slide owing to the cooperation of appropriate slide blocks, which are not only replaceable but also have a low field of friction and permit a long usage life without any risks or problems of jamming and distortion.

A further advantage is the fact that the invention provides for the drawer to be fully extractable from the cabinet only when the user specifically so wishes, such extraction being possible also by the use of the cited outer handle.

Moreover, the cabinet has modular dimensions, so that several cabinets can be combined to provide a three-dimensional structure.

These and other special features will be made clearer in the description hereinafter.

The invention is therefore embodied with a modular cabinet according to the features of claim 1 and the dependent claims.

BRIEF DESCRIPTION OF THE DRAWINGS

The attached figures, which are given as a non-restrictive example, show the following.

DETAILED DESCRIPTION

Figure 1B:
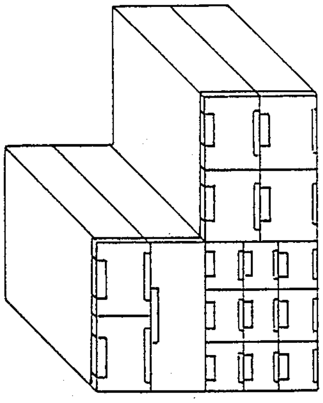
FIG. 1*b* gives a three-dimensional front view of a plurality of different modular cabinets placed side by side and stacked one on another according to a desired usage arrangement.
Figure 1A:
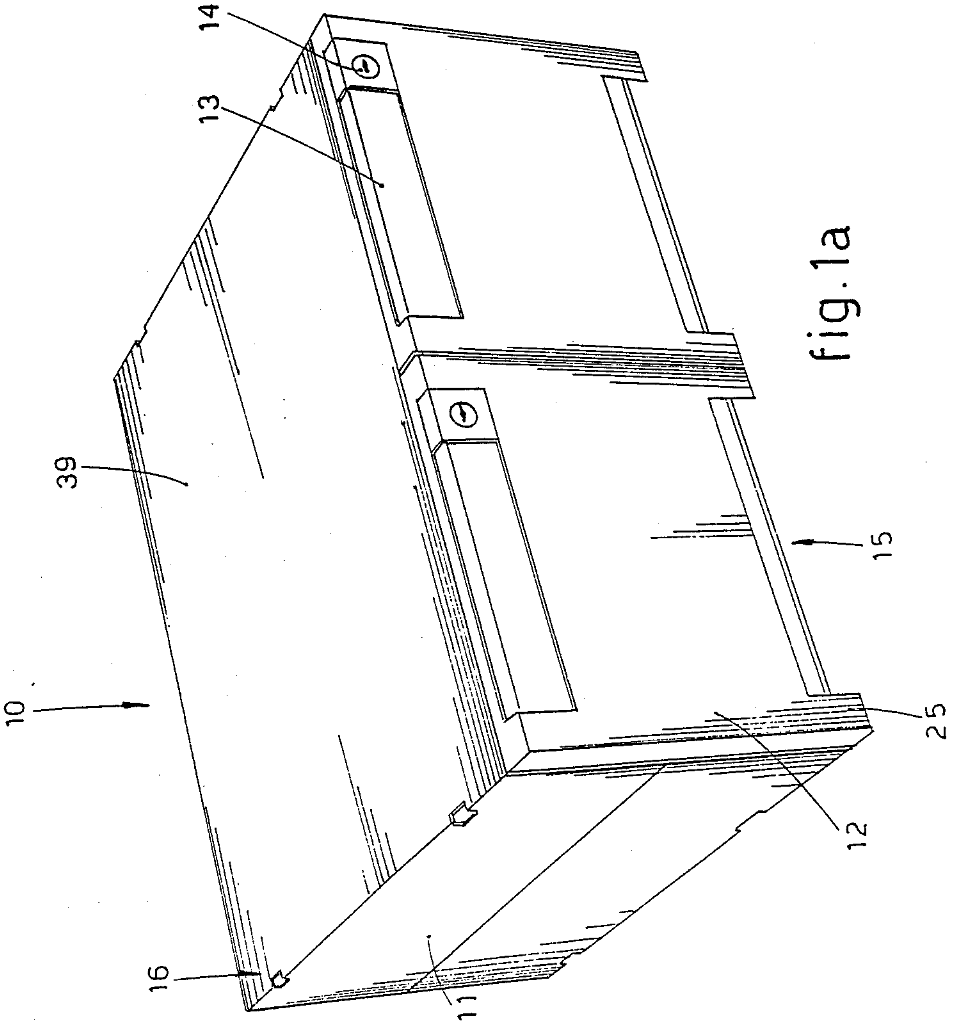
FIG. 1*a* gives a three-dimensional view of a modular cabinet according to the invention with two drawers.

In the figures a modular cabinet 10 comprises a containing case 39 made by combining two half-cases 11 on a horizontal plane; the two half-cases 11 are clamped to each other by a plurality of male-female anchorage assemblies 29 located on the periphery and on the inside of each containing case 39 of the modular cabinet 10.

The case 39 of the cabinet comprises at its front an opening equipped with extraction limits 19 which serve to limit the extraction of drawers 12; these extraction limits 19 serve also to provide closure by means of a lock 14.

In the lower part of the containing case 39 are located reinforcement plates 23 to which are fitted slide blocks 22 that serve to guide the drawers 12 and to simplify and speed up their sliding movement. These slide blocks 22 may consist of individual elements or one single element along an edge and have a substantially h-shaped conformation.

Figure 4A:
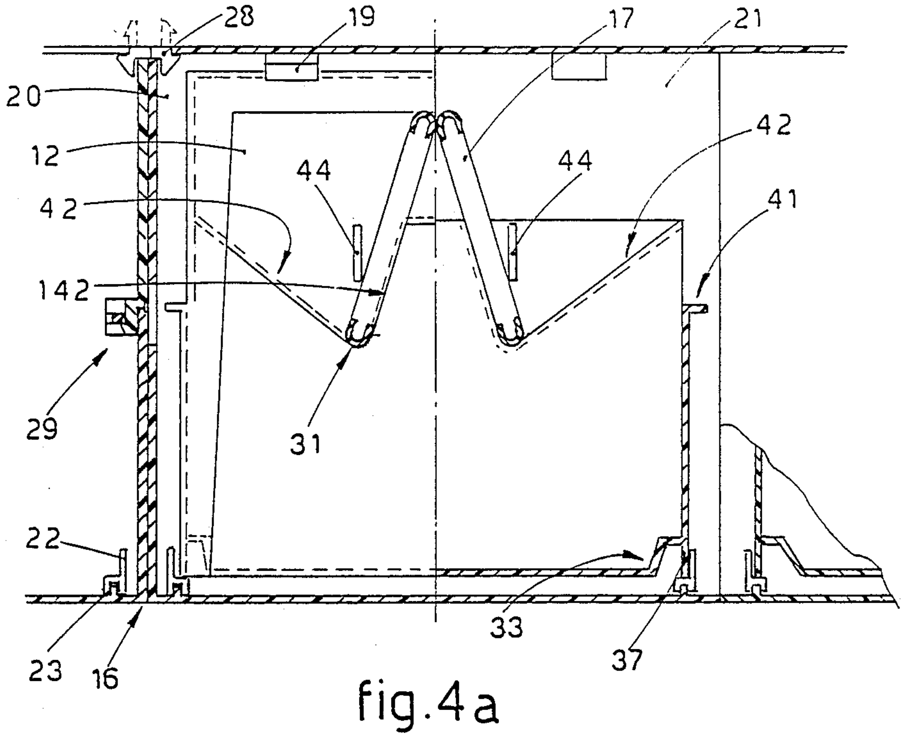
FIG. 4*a* shows a partial, vertical cross section of the cabinet of FIG. 1.
Figure 4B:
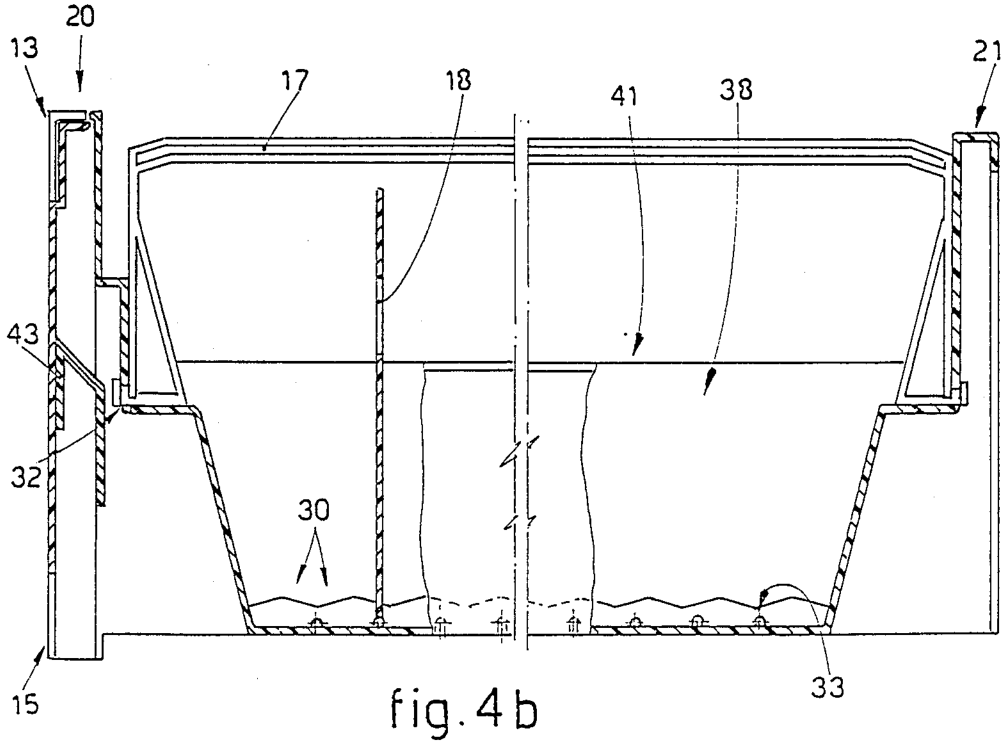
FIG. 4*b* shows a vertical, lengthwise section of a drawer according to FIG. 1.
Figure 5:
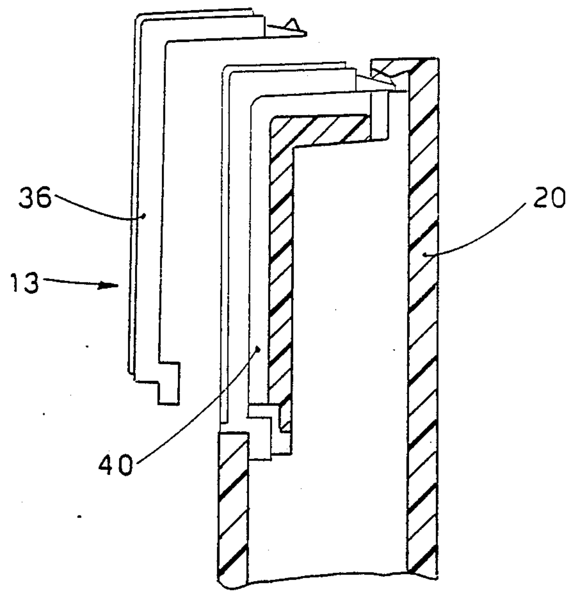
FIG. 5 shows the system for fitting the window which gives information regarding the contents.
Figure 6:
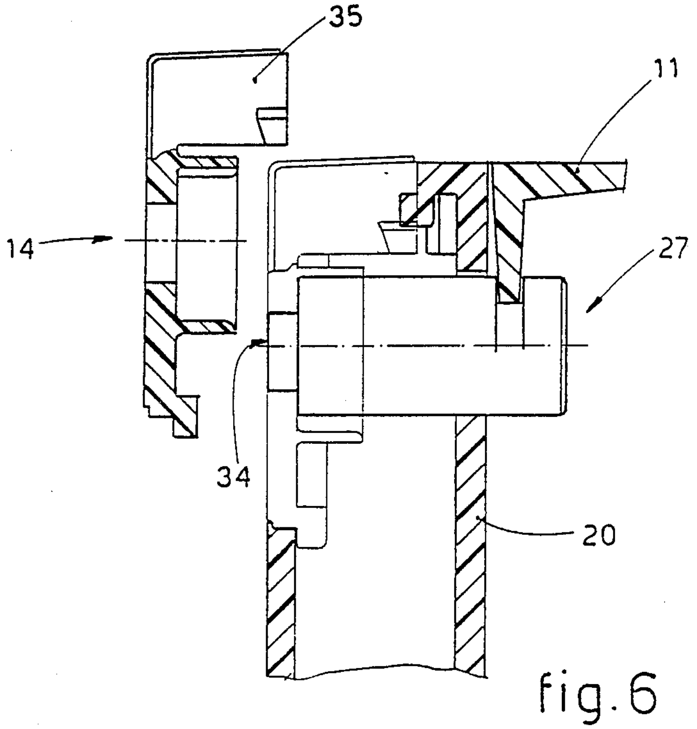
FIG. 6 shows a possible system for fitting a lock.
Figure 7A:
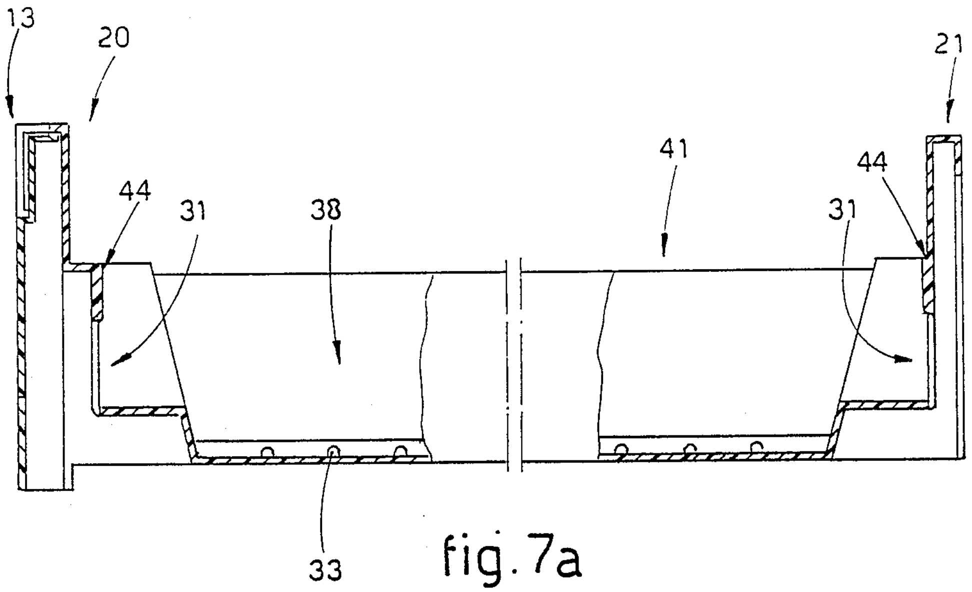
FIGS. 7*a* and 7*b* show a lengthwise, vertical section and a vertical cross section of another drawer, which can be installed side by side with two other drawers in one single modular cabinet.
Figure 7B:
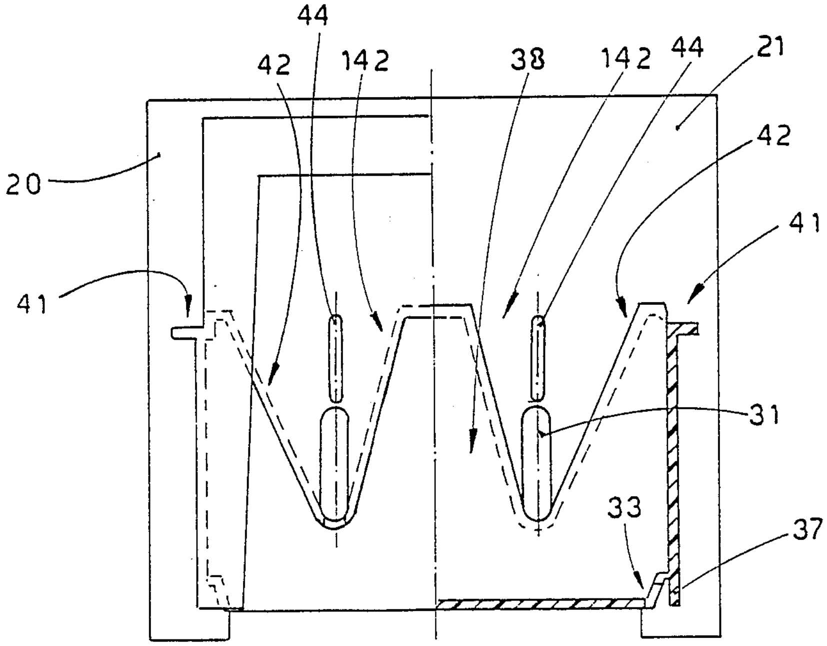

A containing case 39 can cooperate with one single drawer 12 (FIGS. 8*a* and 8*b*) or with two (FIGS. 4*a* and 4*b*) or three drawers (FIGS. 7*a* and 7*b*) or more.

In the combination example of FIG. 1*b* modular cabinets are shown with one, two and three drawers for each modular cabinet 10.

The modular cabinet 10 may have a constant height for each type, namely for each number of drawers provided, or may have two heights according to the number and dimensions of the drawers. The example of FIG. 1*b* shows modular cabinets 10 of two different heights.

A front panel 20 of the drawers 12 comprises on the bottom of its front side an outer front handle 15, and laterally spaced support feet 25. An upper display window 13 which can be read from the front or from above and a lock 14 are located at the top of the front panel 20.

A drawer 12 may comprise in its front panel an auxiliary structural-reinforcement element 43, which may or may not be removable.

As said above, the drawer 12 comprises a front panel 20 and a rear closure panel 21, the rear closure panel 21 being able to abut against the extraction limits 19 during extraction of the drawer 12.

Figure 8A:
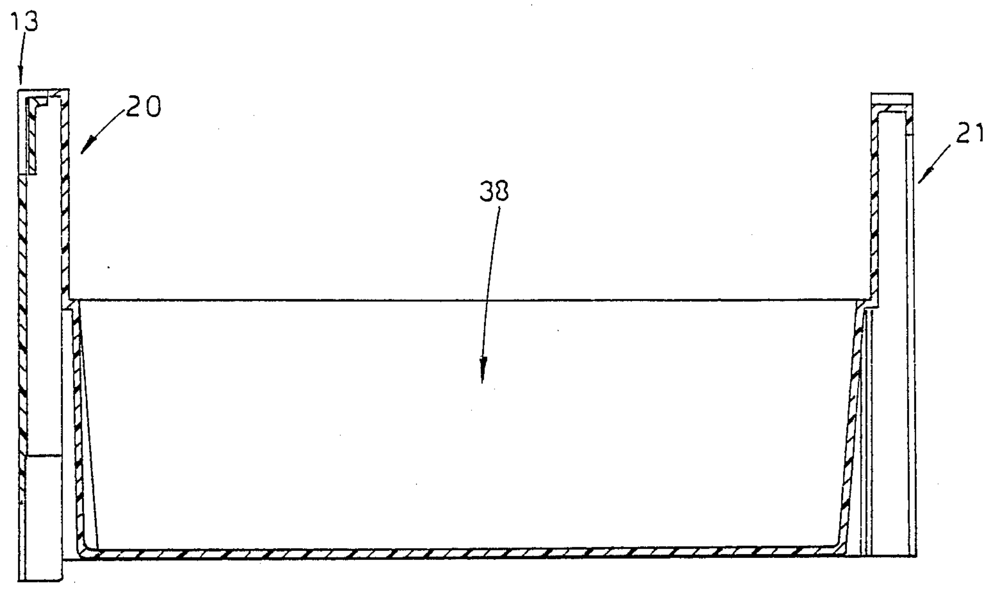
FIGS. 8*a* and 8*b* show a drawer which can be installed by itself alone in a cabinet.
Figure 8B:
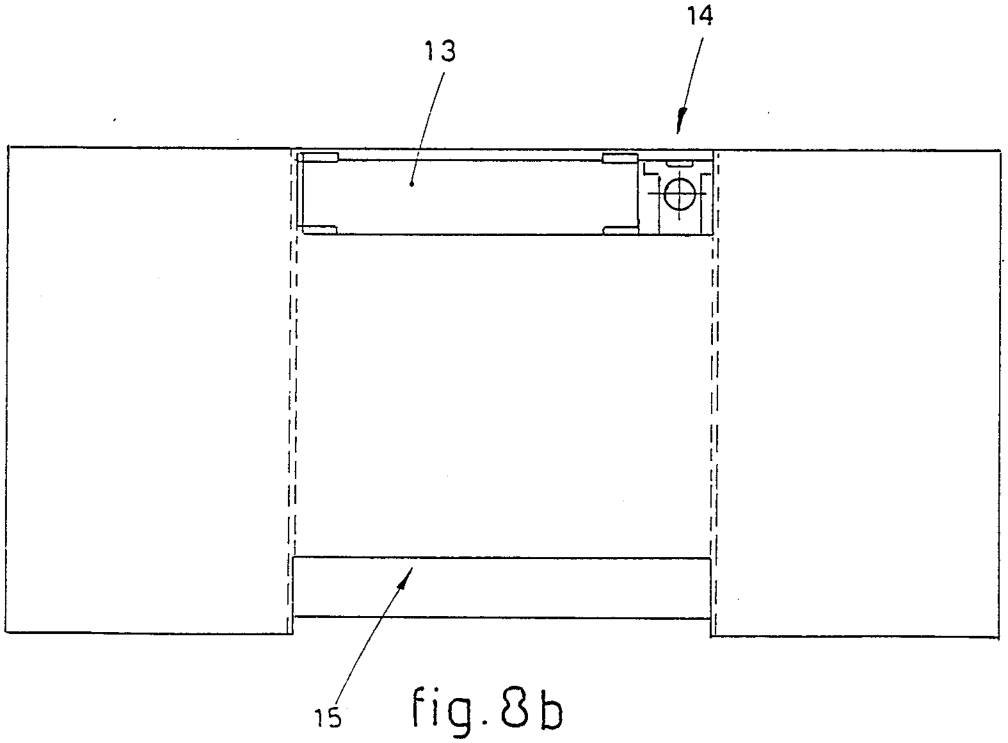

Each drawer 12 comprises a well 38, which may be plain without any special equipment, as in FIG. 8*a* for instance, or have its bottom specially equipped with movable partitions 18 which can be fitted when desired.

A drawer 12 cooperates advantageously with internal independent lengthwise handles 17 which extend between the front and rear panels (20, 21) and comprise a pivot 32 capable of being anchored in holes 31 formed in the front and rear panels.

The holes 31 are conformed and positioned (FIGS. 4 and 7) to suit the geometric characteristics of the drawers 12 so as to enable the internal handles 17 to be standardized.

Reinforcement plates 44 formed in the front and rear panels (20, 21) are included in cooperation with the holes 31 and serve to reinforce the holes 31 and to position the internal handles 17.

Figure 2:
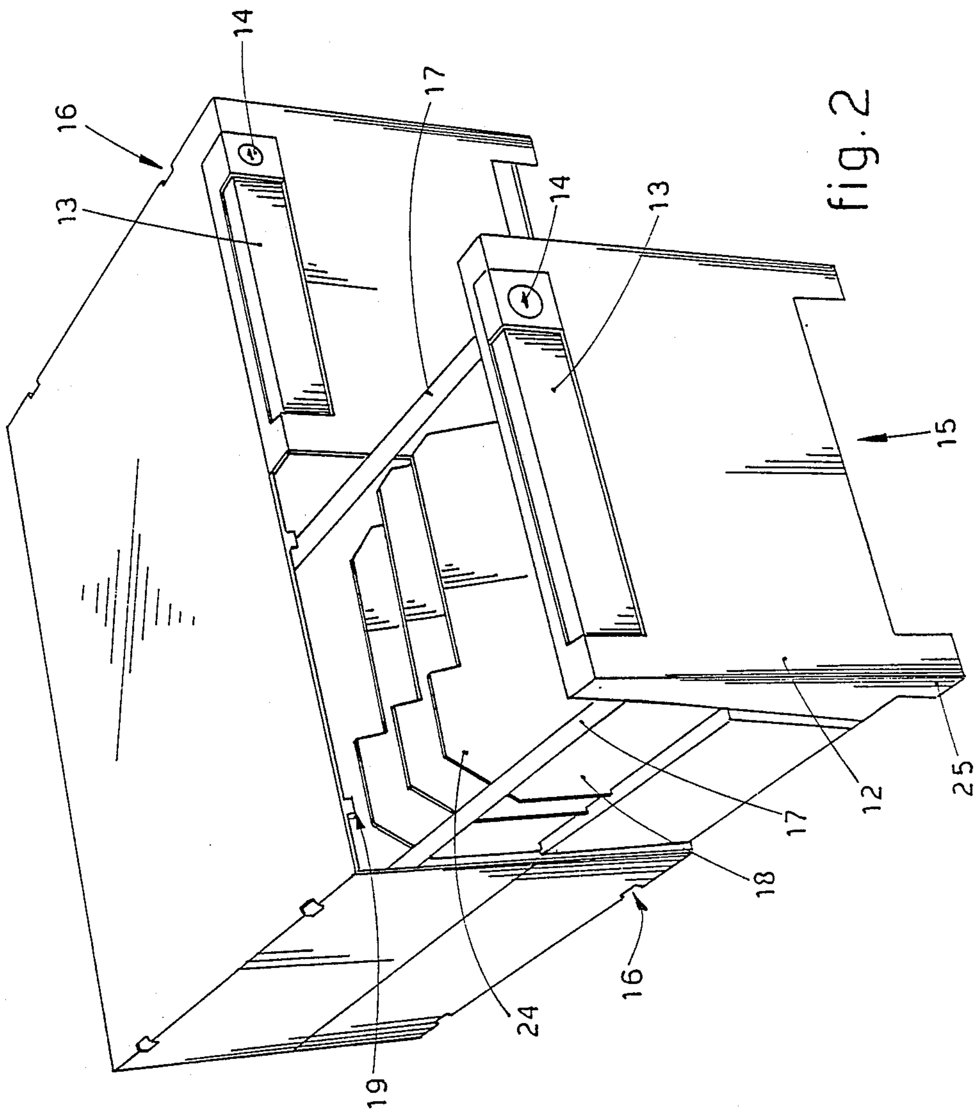
FIG. 2 shows the cabinet of FIG. 1*a* with a drawer partly pulled out.
Figure 3:
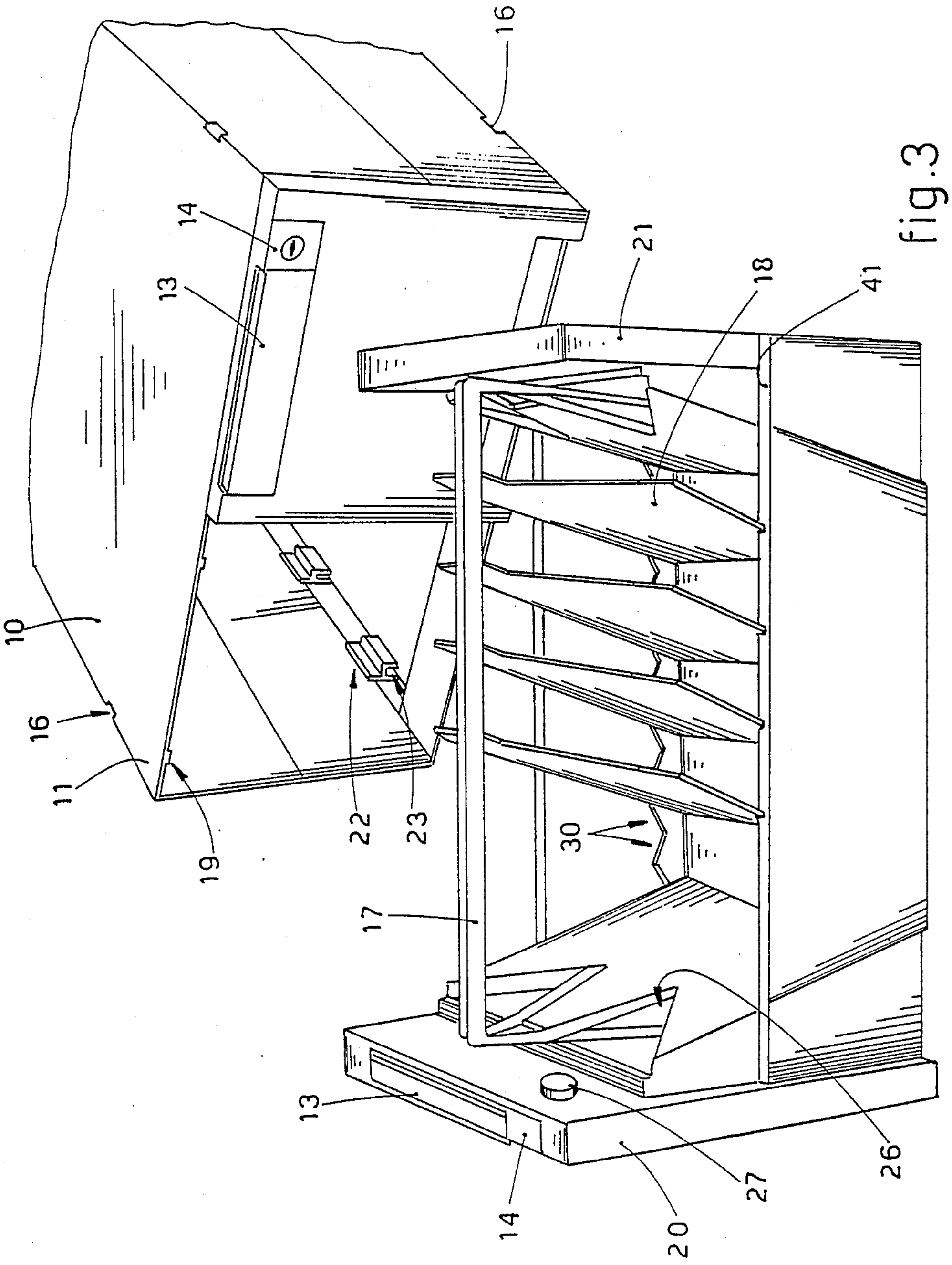
FIG. 3 shows the cabinet of FIG. 1 with a drawer fully extracted.

The internal handles 17 are able to take up a lateral position overlying respective lateral upstanding edges 41 of the well 38 (FIG. 2) for lateral retention of the contents of the drawer, and an extraction position corresponding with a central position overlying a central portion of the well 38 (FIG. 3) able to prevent vertical departure of the contents and, at the same time, to enable an individual drawer 12 to be handled independently and carried.

Appropriate lateral 42 and central 142 positioning ribs are included on the inner side of the front panel 20 and rear closure panel 21 in cooperation with the well 38 so as to improve the services of the half-handles and handle 17 respectively.

When modular cabinets 10 are combined with each other, slider clips 28 for clamping purposes are applied to connecting holes 16 provided on the upper and lower lateral edges of the case 39 and can couple together two, three or four modular cabinets 10 at the same time.

Positioner holes 33 cooperating with the movable partitions 18 are located in the well 38 of the drawers 12.

The movable partitions 18 include advantageously a raised indicator portion 24 and also jutting side portions on each side which are able to cooperate with surfaces 42 of the lateral upstanding edges of the well 38.

The bottom of the well 38 comprises holes 33 and also lateral positioner dividers 30 for correct positioning of the contents. The holes 33 and the dividers 30 are distributed lengthwise along the well 38 adjacent the lateral upstanding edges 41.

The display window 13 comprises an L-shaped window body 36 made of a transparent material to create a containment chamber 40 in which the required information can be inserted.

The conformation of the chamber 40 enables the information contained therein to be read on the upper and front surfaces of the chamber 40.

A lock 14 comprises a display body 35 that cooperates with a bolt 27, which includes at its front an entry 34 for a key and cooperates with the extraction limits 19.

The window body 36 of the display window 13 and the display body 35 of the lock 14 are clamped in position by reciprocal deformation of their parts.

The drawers 12 comprise continuous lateral slide paths 37 which cooperate with the replaceable slide blocks 22.

I claim:

1. A modular cabinet (10) to hold and transport floppy-disks, mini-disks, cards and other office materials in an organized manner, which comprises a cabinet case (39) adapted for attachment to other cabinets, at least one drawer (12) with a front panel (20) and rear closure panel (21), the panels (20–21) being connected by a well (38) having lateral upstanding edges (41), two inner lengthwise handles disposed in said well (38) of said drawer (12), said handles (17) extending between said front and rear panels (20, 21) and being pivotally connected thereto, each said handle (17) being pivotably movable between first and second positions, said first position overlying a central portion of said well (38), and said second position overlying a respective said lateral upstanding edge of said well (38).

2. A modular cabinet (10) as claimed in claim 1, including reinforcement plates (23) located in a lower part of the cabinet case (39) with replaceable slide blocks (22) fitted thereon, said slide blocks cooperating with lower lateral slide paths (37) on the drawers (12), the replaceable slide blocks (22) having an h-shaped conformation.

3. A modular cabinet (10) as claimed in claim 1, in which the inner handles (17) are cooperable with holes (31) formed in said front and rear panels and with lateral (42) and central (142) positioning ribs formed in said front and rear panels.

4. A modular cabinet (10) as claimed in claim 1, in which the bottom of the well (38) comprises positioner holes (33) and lateral positioner dividers (30) distributed lengthwise along said well adjacent the lateral upstanding edges thereof.

5. A modular cabinet (10) as claimed in claim 4, including modular partitions (18) having a raised indicator portion (24) and jutting side portions cooperable with the edges (41) of the well (38), said modular partitions being cooperable with the positioner holes (33).

6. A modular cabinet (10) as claimed in claim 1, in which the cabinet case (39) comprises two half-cases (11) coupled by a plurality of anchorage assemblies (29), said anchorage assemblies being positioned in a generally horizontal plane.

7. A modular cabinet (10) as claimed in claim 1, in which the cabinet case (39) comprises at its lateral edges coordinated connecting holes (16), and clamping slider clips (28) engaged in said connecting holes.

8. A modular cabinet (10) as claimed in claim 1, in which the cabinet case has a front aperture for receiving said drawer and the front aperture of the cabinet case (39) comprises means (19) to limit extraction of the drawers (12), such means (19) including means for abutting against the rear closure panel (21) of the drawer (12).

9. The modular cabinet of claim 1, said front panel including at its bottom laterally spaced support feet (25) and a central outer handle (15), said front panel also including an upper information display window (13) and a lock (14).

10. The modular cabinet of claim 9, said front panel further including an auxiliary structural reinforcement element (43).

11. The modular cabinet of claim 1, said front and rear panels including holes (31) engageable with said handles, and reinforcement plates (44).

12. A modular cabinet (10) to hold and transport floppy-disks, mini-disks, cards and other office materials in an organized manner, which comprises a cabinet case (39) adapted for attachment to other cabinets, at least one extractable drawer (12) with a front panel (20) and rear closure panel (21), the panels (20–21) being connected by a well (38) having lateral upstanding edges (41), the front panel (20) comprising at its bottom laterally spaced support feet (25) and a lower central outer handle (15), said front panel further including an upper information display window (13) and a lock (14), the bottom of the well (38) including positioner holes (33) and lateral positioner dividers (30) distributed lengthwise along said well adjacent the lateral upstanding edges thereof.

* * * * *